(12) United States Patent
Ju (10) Patent No.: US 12,550,173 B2
(45) Date of Patent: Feb. 10, 2026

(54) METHOD FOR DETERMINING SPACE ASSOCIATION RELATIONSHIP BETWEEN USERS, BASE STATION, AND STORAGE MEDIUM

(71) Applicant: ZTE CORPORATION, Shenzhen (CN)

(72) Inventor: Wentao Ju, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 324 days.

(21) Appl. No.: 18/556,866

(22) PCT Filed: Apr. 22, 2022

(86) PCT No.: PCT/CN2022/088404
§ 371 (c)(1),
(2) Date: Oct. 23, 2023

(87) PCT Pub. No.: WO2022/223017
PCT Pub. Date: Oct. 27, 2022

(65) Prior Publication Data
US 2024/0215057 A1    Jun. 27, 2024

(30) Foreign Application Priority Data
Apr. 23, 2021  (CN) .......................... 202110443763.3

(51) Int. Cl.
*H04W 72/51* (2023.01)
*H04B 7/0408* (2017.01)
(Continued)

(52) U.S. Cl.
CPC .......... *H04W 72/51* (2023.01); *H04B 7/0408* (2013.01); *H04L 5/0037* (2013.01); *H04W 64/006* (2013.01); *H04W 72/046* (2013.01)

(58) Field of Classification Search
CPC .................................................. H04W 64/006
See application file for complete search history.

(56) References Cited

U.S. PATENT DOCUMENTS

| 10,348,384 B1 | 7/2019 | Ni et al. |
| 2005/0101354 A1 | 5/2005 | Yang |
| 2020/0403662 A1 | 12/2020 | Sitaram et al. |

FOREIGN PATENT DOCUMENTS

| CN | 108092701 A | 5/2018 |
| CN | 108347272 A | 7/2018 |

(Continued)

OTHER PUBLICATIONS

International Search Report in Application No. PCT/CN2022/088404, dated Jun. 24, 2022, 4 pages, including translation.

(Continued)

*Primary Examiner* — Pamit Kaur
(74) *Attorney, Agent, or Firm* — Morgan, Lewis & Bockius LLP (57) ABSTRACT

Provided are a method for determining a space association relationship between users, a base station, and a storage medium. The method includes the following: An energy value of an energy projection of a downlink scheduling service of each UE of multiple user equipments (UEs) on each preset beam of multiple preset beams is acquired; a preset beam corresponding to an energy value meeting a preset beam home condition among all energy values of an energy projection of the downlink scheduling service of each UE on all preset beams is used as a home beam of each UE; a space association relationship between the two UEs is determined according to home beams and preset beam space correlation data of two UEs in the multiple UEs. The preset beam space correlation data includes a space correlation relationship value between every two preset beams in the multiple preset beams.

20 Claims, 3 Drawing Sheets

An energy value of an energy projection of a downlink scheduling service of each UE of multiple user equipments (UEs) on each preset beam of multiple preset beams is acquired — S110

A preset beam corresponding to an energy value meeting a preset beam home condition among all energy values of an energy projection of the downlink scheduling service of each UE on all preset beams is used as a home beam of each UE — S120

A space association relationship between the two UEs is determined according to home beams and preset beam space correlation data of two UEs in the multiple UEs — S130

(51) Int. Cl.
*H04L 5/00* (2006.01)
*H04W 64/00* (2009.01)
*H04W 72/044* (2023.01)

(56) References Cited

FOREIGN PATENT DOCUMENTS

| | | | |
|---|---|---|---|
| CN | 110620604 A | 12/2019 | |
| WO | WO-2017099830 A1 * | 6/2017 | ......... H04B 7/06952 |

OTHER PUBLICATIONS

Extended European Search Report in Application No. 22791123.7, dated Feb. 10, 2025, 9 pages.

* cited by examiner

METHOD FOR DETERMINING SPACE ASSOCIATION RELATIONSHIP BETWEEN USERS, BASE STATION, AND STORAGE MEDIUM

CROSS REFERENCE TO RELATED APPLICATIONS

This is a national stage application filed under 37 U.S.C. 371 based on International Patent Application No. PCT/CN2022/088404, filed Apr. 22, 2022, which claims priority to Chinese Patent Application 202110443763.3 filed Apr. 23, 2021, the disclosures of which are incorporated herein by reference in their entireties.

TECHNICAL FIELD

The present application relates to communication technology, for example, a method for determining a space association relationship between users, a base station, and a storage medium.

BACKGROUND

In the 5th generation mobile communication technology (5G) system, higher frequency points are used, cell coverage becomes smaller, transmission bandwidth increases, more users are in the network, and interference of service channels between users increases. The use of massive multiple input multiple output (Massive MIMO) technology can increase the system capacity. The use of Massive MIMO and spatial multiplexing technology requires measuring channel state information according to an uplink sounding reference signal (SRS) of a User Equipment (UE). The base station calculates space correlation of antenna ports of users' receiving and sending terminals in real time. If orthogonality between the antenna ports is poor, interference between data streams between the channels is serious during the space division multiplexing, resulting in traffic loss.

In a multi-user MIMO (MU-MIMO) system, a 5G base station needs to receive SRS measurement information reported by a large number of users and use SRS to calculate an association relationship between users. A base station side not only needs to consider factors such as Doppler frequency offset and time offset, which affect the timeliness and accuracy of receiving SRS at the base station side, but also consider calculation overhead of calculating the correlation between a large number of users. However, some user equipments are not configured with SRS. These users have no correlation but still need to use the space division multiplexing technology.

SUMMARY

The present application provides a method for determining a space association relationship between users, a base station, and a storage medium to reduce the computational burden of determining the space association relationship between users by a base station and ensure the system capacity.

Embodiments of the present application provide a method for determining a space association relationship between users. The method includes the following steps below.

An energy value of an energy projection of a downlink scheduling service of each UE of multiple user equipments (UEs) on each preset beam of multiple preset beams is acquired.

A preset beam corresponding to an energy value meeting a preset beam home condition among all energy values of an energy projection of the downlink scheduling service of each UE on the plurality of preset beams is used as a home beam of each UE.

A space association relationship between the two UEs is determined according to home beams of two UEs of the plurality of UEs and preset beam space correlation data. The preset beam space correlation data includes a space correlation relationship value between every two preset beams of the multiple preset beams.

Embodiments of the present application provide a base station. The base station includes a memory, a processor, a program stored on the memory and executable on the processor, and a data bus for enabling connection communication between the processor and the memory. The program, when executed by the processor, implements the method for determining a space association relationship between users of any embodiment of the present application.

Embodiments of the present application also provide a storage medium for computer-readable storage. The storage medium stores at least one programs executable by at least one processor to implement the method for determining a space association relationship between users of any embodiment of the present application.

DETAILED DESCRIPTION

Embodiments of the present application are described hereinafter in detail in conjunction with drawings. It is to be understood that the specific embodiments described herein are intended to explain the present application and not to limit the present application.

Suffixes such as "module", "component", or "unit" used for indicating elements in the subsequent description are used merely for facilitating the description of the present application and have no particular meaning in themselves. Therefore, "module", "component", or "unit" may be used in a mixed manner.

Figure 1:
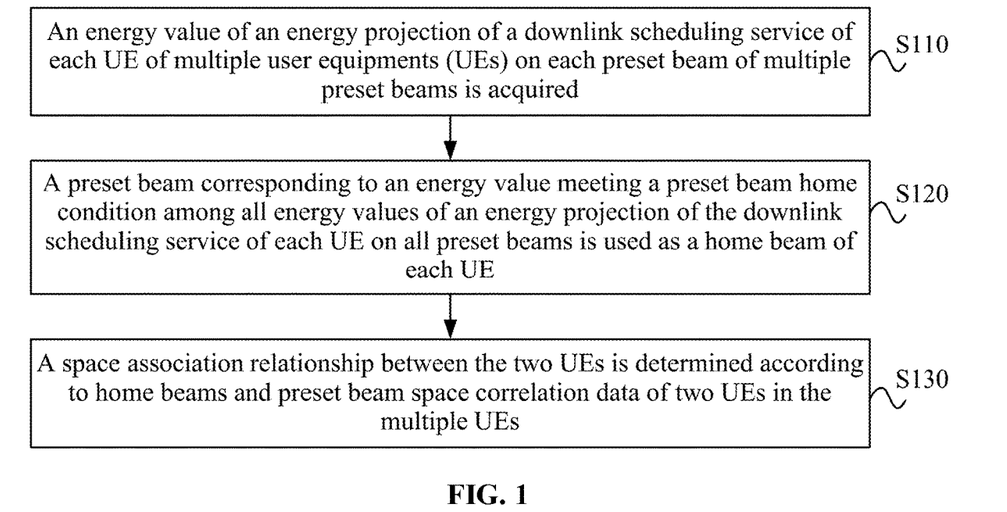
FIG. 1 is a flowchart of a method for determining a space association relationship between users according to embodiments of the present application.

This embodiment provides a method for determining a space association relationship between users. As shown in FIG. 1, the method for determining a space association relationship between users includes the operations described below.

In S110, an energy value of an energy projection of a downlink scheduling service of each UE of multiple user equipments (UEs) on each preset beam of multiple preset beams is acquired.

The energy value of the energy projection of the downlink scheduling service of each UE on each preset beam is obtained in a manner where the energy projection is performed on each preset beam by the downlink scheduling service of each UE.

In S120, a preset beam corresponding to an energy value meeting a preset beam home condition among all energy values of an energy projection of the downlink scheduling service of each UE on the multiple preset beams is used as a home beam of each UE.

In S130, a space association relationship between the two UEs is determined according to home beams of two UEs of the multiple UEs and preset beam space correlation data; the preset beam space correlation data includes a space correlation relationship value between every two preset beams of the multiple preset beams.

When a base station has downlink data to send on a physical downlink shared channel (PDSCH), the base station selects a preset beam suitable for the UE for scheduling to maximize spectrum efficiency.

The base station performs energy projection on multiple pre-generated preset beams separately according to the downlink scheduling service of the UE so that the energy value projected on each preset beam by the downlink scheduling service of the UE can be obtained. The preset beams may be multiple narrow beams generated on an air interface by using physical space attributes of a channel state information-reference signal (CSI-RS) in the horizontal dimension and the vertical dimension. Energy values projected on multiple preset beams may be compared, and according to a preset beam home condition, a preset beam is selected for the UE and used as the UE's home beam. The preset beam home condition is configured to maximize spectral efficiency. For example, a preset beam with a higher projected energy value may be selected as the home beam of the UE.

The preceding method of determining a home beam is adopted so that a corresponding home beam can be determined for each UE, and service data is transmitted using the home beam. Generally, multiple UEs may need to perform service scheduling simultaneously. The use of space division multiplexing technology requires determining the space association relationship between different UEs. In the case of multiple UEs performing service scheduling, it is necessary to determine the space association relationship between every two UEs. Since the home beam of each UE has been determined and the home beam of each UE is one of the multiple preset beams, the spatial interval (space correlation relationship value) between any two preset beams may also be determined in advance after the preset beams are generated. A set of the space correlation relationship values between every two preset beams is the preset beam space correlation data. The space correlation relationship value between the home beams of the two UEs may be queried from the preset beam space correlation data by using home beams of two UEs, and then the space correlation relationship value of the two home beams also represents the space association relationship of the corresponding two UEs.

The space association relationship between every two UEs may be used as a basis for determining the degree of signal interference between UEs. Space correlation (space association relationship) of different terminal users under different preset beams is acquired. The smaller the correlation between two UEs is, the more orthogonal the terminal users tend to be. For terminals whose orthogonality meets a preset requirement, MU-MIMO may be used to send data to improve network capacity. When the uplink SRS measurement is inaccurate, the SRS measurement reported by the UE is lost, or the UE capability level does not support SRS rotation, the use of beam quantization correlation can well compensate for system performance loss due to the inability to perform large-scale multi-user space division multiplexing caused by insufficient correlation measurement information. Moreover, the computational burden of determining the space association relationship between users by a base station is reduced.

In the method for determining a space association relationship between users according to the embodiment of the present application, a UE's home beam is determined by the energy projection of the UE's downlink scheduling service on a preset beam, and the space association relationship between users is determined by using the space correlation between home beams. In this manner, the space association relationship between users is calculated without dependence on SRS, the computational burden of determining the space association relationship between users by a base station is reduced, and the system capacity is ensured.

Figure 2:
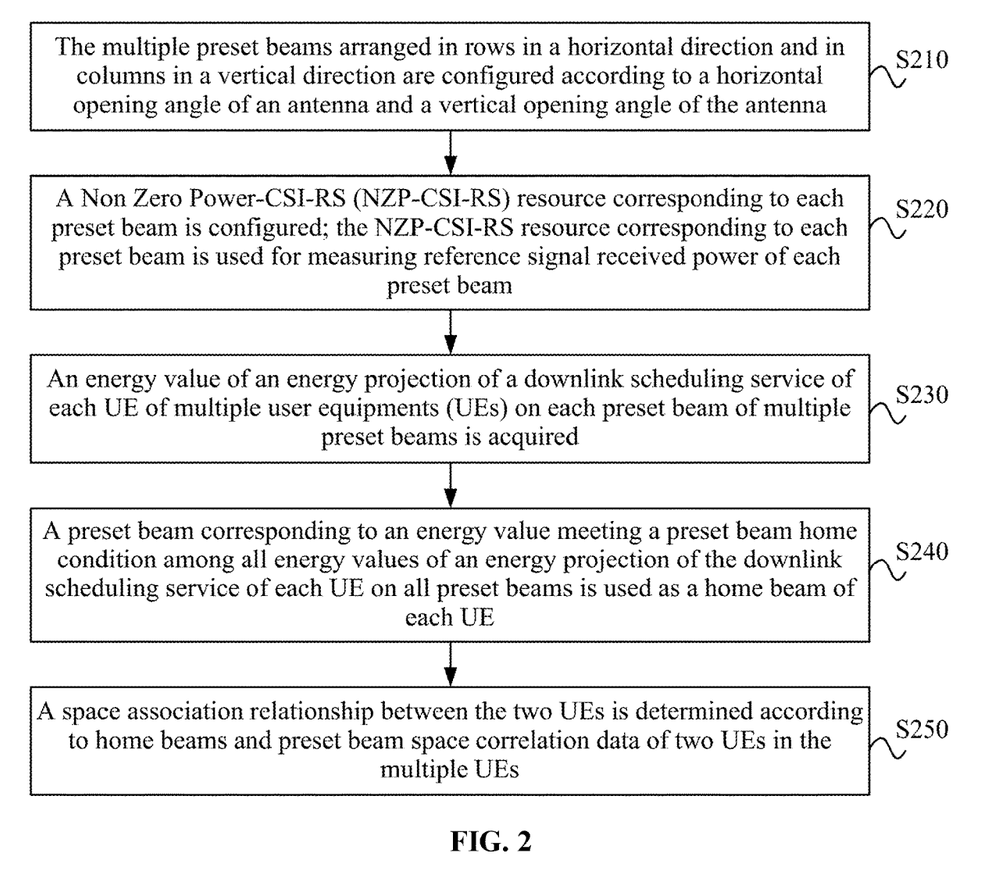
FIG. 2 is a flowchart of another method for determining a space association relationship between users according to embodiments of the present application.

In an implementation as shown in FIG. 2, a method for determining a space association relationship between users includes the operations described below.

In S210, the multiple preset beams arranged in rows in a horizontal direction and in columns in a vertical direction are configured according to a horizontal opening angle of an antenna and a vertical opening angle of the antenna.

In S220, a Non Zero Power-CSI-RS (NZP-CSI-RS) resource corresponding to each preset beam is configured; the NZP-CSI-RS resource corresponding to each preset beam is used for measuring reference signal received power of each preset beam.

In S230, an energy value of an energy projection of a downlink scheduling service of each UE of multiple UEs on each preset beam of multiple preset beams is acquired.

The energy value of the energy projection of the downlink scheduling service of each UE on each preset beam is obtained in a manner where the energy projection is performed on each preset beam by the downlink scheduling service of each UE.

In S240, a preset beam corresponding to an energy value meeting a preset beam home condition among all energy values of an energy projection of the downlink scheduling service of each UE on the multiple preset beams is used as a home beam of each UE.

In S250, a space association relationship between the two UEs of two UEs of the multiple UEs is determined according to home beams and preset beam space correlation data.

An antenna has preset opening angles in the horizontal and vertical directions. Different antennas usually have different opening angles. In combination with the actual network, the air interface of the antenna may be divided into multiple rows and columns of narrow beams according to a horizontal opening angle of the antenna and a vertical opening angle of the antenna. The narrow beams are used as multiple preset beams. Moreover, a NZP-CSI-RS resource corresponding to each preset beam is configured. In this manner, each NZP-CSI-RS resource correspondingly measures reference signal receiving power (RSRP) at a physical layer (L1) of a preset beam to determine the signal strength of the UE on the corresponding measured preset beam.

In an implementation, configuring, according to the horizontal opening angle of the antenna and the vertical opening angle of the antenna, the multiple preset beams arranged in rows in the horizontal direction and in columns in the vertical direction includes the following: generating the multiple preset beams on an air interface by division of the horizontal opening angle of the antenna according to a first division number and division of the vertical opening angle of the antenna according to a second division number.

The number of columns into which the air interface is divided may be determined according to the horizontal opening angle of the antenna, and the number of rows into which the air interface is divided may be determined according to the vertical opening angle of the antenna, so as to complete the division of the air interface space and generate the multiple preset beams. The division of the horizontal opening angle of the antenna and the vertical opening angle of the antenna, equal division or non-equal division may be adopted. For example, the air interface may be divided into 8 beams in the horizontal direction and 4 beams in the vertical direction, with a total of 32 preset beams. Of course, the air interface may also be divided into 12, 16, or 64 beams.

The location distribution of the UE is uncertain, and the location distribution of multiple UEs is often uneven. Thus, it is considered that equally dividing the horizontal opening angle of the antenna and the vertical opening angle of the antenna may cover multiple UEs in the cell in a balanced manner. The horizontal opening angle of the antenna may be equally divided, and the vertical opening angle of the antenna may also be equally divided. The equal division of the horizontal opening angle of the antenna and the equal division of the vertical opening angle of the antenna may be customized according to the situation of the antenna, that is, the first division number and the second division number may be customized. For example, it is considered that the horizontal opening angle of the antenna is equally divided into 8 to generate 8 columns of beams, and the vertical opening angle of the antenna is equally divided into 4 to generate 4 rows of beams. In this manner, 32 preset beams can be generated, arranged in 4 rows and 8 columns.

In an implementation, configuring the Non Zero Power-CSI-RS (NZP-CSI-RS) resource corresponding to each preset beam includes configuring single-port NZP-CSI-RS resources whose number is the same as the number of the multiple preset beams through a higher-layer signaling and configuring a corresponding relationship between each NZP-CSI-RS resource and one preset beam of the multiple preset beams.

The number of preset beams is a UE capability-level parameter. Some UEs may support less than 32 NZP-CSI-RS resources and may support 16 or 8 NZP-CSI-RS resources. In this example, only 32 preset beams are used for illustration. After multiple preset beams are generated, indexes corresponding to the multiple preset beams may be assigned. NZP-CSI-RS resources whose number is the same as the number of the preset beams are configured. Each NZP-CSI-RS resource correspondingly measures L1-RSRP of one preset beam. For example, for 32 preset beams, 32 NZP-CSI-RS resources need to be established and correspond to the 32 preset beams, respectively. Each UE in the cell is configured with the same NZP-CSI-RS resource. An NZP-CSI-RS resource with a density of 1, in a cell-specific single-port mode, and with the same number as the preset beams may be configured in CSI-MeasConfig through Radio Resource Control (RRC) layer higher-layer signaling, and each UE receives the reference signal (that is, NZP-CSI-RS).

In an implementation, after configuring the Non Zero Power-CSI-RS (NZP-CSI-RS) resource corresponding to each preset beam, the method further includes determining the space correlation relationship value between every two preset beams according to beam power of every two preset beams and space relationship between every two preset beams. The preset beam space correlation data are a set of the space correlation relationship value between every two preset beams of the multiple preset beams.

According to the antenna weight vectors of any two preset beams, the physical layer calculates, in a simulated manner, the projected energy (that is, the energy density) between any two preset beams, and performs normalization and quantification of the space association relationship according to the projected energy to obtain the space correlation data (space correlation relationship value) of the any two preset beams.

An example is used where 32 preset beams arranged in 4 rows and 8 columns. For any two preset beams in CSI-RS 32 preset beams, namely, $b_i$ and $b_j$, the energy density between the preset beams $b_i$ and $b_j$ equals $(\langle b_i, b_j \rangle / (|b_i| \cdot |b_j|))^2$, and the space correlation relationship value equals $\langle b_i, b_j \rangle / (|b_i| \cdot |b_j|)$.

In the formulas, $b_i$ and $b_j$ denote the antenna weight vector of the preset beam i and the antenna weight vector of the preset beam j, respectively, where $$b_i = \begin{bmatrix} w_{i00} & w_{i01} \\ w_{i10} & w_{i11} \end{bmatrix}, \text{ and } b_j = \begin{bmatrix} w_{j00} & w_{j01} \\ w_{j10} & w_{j11} \end{bmatrix};$$

$\langle \ \rangle$ denotes the inner product; $|\cdot|$ denotes the norm.

In this implementation, 8 preset beams exist in the same row in the horizontal direction where the width of each preset beam is 15 degrees, and the power difference between adjacent preset beams in the same row is 3 dB. 4 preset beams exist in the same column in the vertical direction where the width of each preset beam is 6 degrees, and the power difference between adjacent preset beams in the same column is 3 dB. The normalized antenna distance in the horizontal direction is that dh=0.537 separately, and the normalized antenna distance in the vertical direction is that dv=0.653*3 separately. The angle-pointing vectors of the 8 preset beams in the horizontal direction are [−52, −37, −22, −7, 7, 22, 37, 52] degrees. The angle-pointing vectors of the 4 preset beams in the vertical direction are [−6, 0, 6, 12] degrees. The physical space composed of the horizontal direction and the vertical direction has a total of 32 preset beams.

The numerical order of the 32 preset beams may be horizontal first and then vertical. The vertical direction starts from −6 degrees (rising). The space angle orientation is described in Table 1 below.

TABLE 1

| Angle | Beam | | | | | | | |
|---|---|---|---|---|---|---|---|---|
| | −52 deg | −37 deg | −22 deg | −7 deg | 7 deg | 22 deg | 37 deg | 52 deg |
| −6 deg | 0 | 1 | 2 | 3 | 4 | 5 | 6 | 7 |
| 0 deg | 8 | 9 | 10 | 11 | 12 | 13 | 14 | 15 |
| 6 deg | 16 | 17 | 18 | 19 | 20 | 21 | 22 | 23 |
| 12 deg | 24 | 25 | 26 | 27 | 28 | 29 | 30 | 31 |

Figure 3:
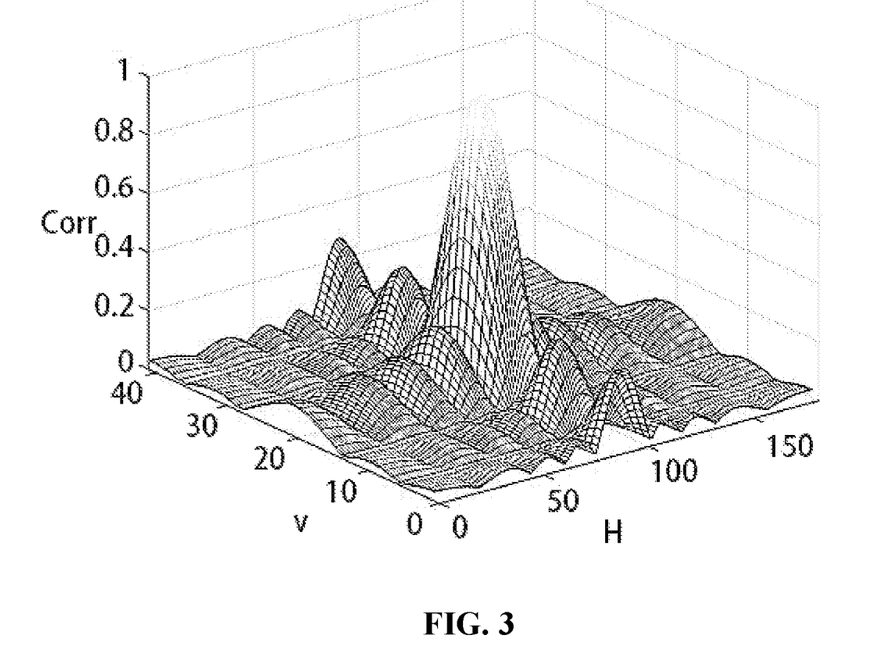
FIG. 3 is a 3-D schematic diagram of a preset beam correlation matrix according to embodiments of the present application.

The obtained 3-D diagram of a correlation matrix is shown in FIG. 3. A pairwise correlation among the 32 preset beams is seen from FIG. 3. The period is essentially eight beams since after 8 beams, traversing goes to adjacent vertical preset beams. After quantization, the space correlation relationship value Corr between every two beams is described in Table 2 to Table 5 below.

TABLE 2

| Corr | Beam 0 | Beam 1 | Beam 2 | Beam 3 | Beam 4 | Beam 5 | Beam 6 | Beam 7 | Beam 8 | Beam 9 | Beam 10 | Beam 11 | Beam 12 | Beam 13 | Beam 14 | Beam 15 |
|---|---|---|---|---|---|---|---|---|---|---|---|---|---|---|---|---|
| Beam 0 | 1 | 0.238 | 0.126 | 0.055 | 0.035 | 0.002 | 0.016 | 0.178 | 0.224 | 0.053 | 0.028 | 0.013 | 0.008 | 0.001 | 0.004 | 0.04 |
| Beam 1 | 0.238 | 1 | 0.025 | 0.033 | 0.045 | 0.072 | 0.071 | 0.016 | 0.053 | 0.224 | 0.006 | 0.007 | 0.01 | 0.016 | 0.016 | 0.004 |
| Beam 2 | 0.126 | 0.025 | 1 | 0.08 | 0.068 | 0.083 | 0.072 | 0.002 | 0.028 | 0.006 | 0.224 | 0.018 | 0.015 | 0.019 | 0.016 | 0.001 |
| Beam 3 | 0.055 | 0.033 | 0.08 | 1 | 0.046 | 0.068 | 0.045 | 0.035 | 0.013 | 0.007 | 0.018 | 0.224 | 0.01 | 0.015 | 0.01 | 0.008 |
| Beam 4 | 0.035 | 0.045 | 0.068 | 0.046 | 1 | 0.08 | 0.033 | 0.058 | 0.008 | 0.01 | 0.015 | 0.01 | 0.224 | 0.018 | 0.007 | 0.013 |
| Beam 5 | 0.002 | 0.072 | 0.083 | 0.068 | 0.08 | 1 | 0.025 | 0.126 | 0.001 | 0.016 | 0.019 | 0.015 | 0.018 | 0.224 | 0.006 | 0.028 |
| Beam 6 | 0.016 | 0.071 | 0.072 | 0.045 | 0.033 | 0.025 | 1 | 0.238 | 0.004 | 0.016 | 0.016 | 0.01 | 0.007 | 0.006 | 0.224 | 0.053 |
| Beam 7 | 0.178 | 0.016 | 0.002 | 0.035 | 0.058 | 0.126 | 0.238 | 1 | 0.04 | 0.004 | 0.001 | 0.008 | 0.013 | 0.028 | 0.053 | 0.224 |
| Beam 8 | 0.224 | 0.053 | 0.028 | 0.013 | 0.008 | 0.001 | 0.004 | 0.04 | 1 | 0.238 | 0.126 | 0.058 | 0.035 | 0.002 | 0.016 | 0.178 |
| Beam 9 | 0.053 | 0.224 | 0.006 | 0.007 | 0.01 | 0.016 | 0.016 | 0.004 | 0.238 | 1 | 0.025 | 0.033 | 0.045 | 0.072 | 0.071 | 0.016 |
| Beam 10 | 0.028 | 0.006 | 0.224 | 0.018 | 0.015 | 0.019 | 0.016 | 0.001 | 0.126 | 0.025 | 1 | 0.08 | 0.068 | 0.083 | 0.072 | 0.002 |
| Beam 11 | 0.013 | 0.007 | 0.018 | 0.224 | 0.01 | 0.015 | 0.01 | 0.008 | 0.058 | 0.033 | 0.08 | 1 | 0.046 | 0.068 | 0.045 | 0.035 |
| Beam 12 | 0.008 | 0.01 | 0.015 | 0.01 | 0.224 | 0.018 | 0.007 | 0.013 | 0.035 | 0.045 | 0.068 | 0.046 | 1 | 0.08 | 0.033 | 0.058 |
| Beam 13 | 0.001 | 0.016 | 0.019 | 0.015 | 0.018 | 0.224 | 0.006 | 0.028 | 0.002 | 0.072 | 0.083 | 0.068 | 0.08 | 1 | 0.025 | 0.126 |
| Beam 14 | 0.004 | 0.016 | 0.016 | 0.01 | 0.007 | 0.006 | 0.224 | 0.053 | 0.016 | 0.071 | 0.072 | 0.045 | 0.033 | 0.025 | 1 | 0.268 |
| Beam 15 | 0.04 | 0.004 | 0.001 | 0.008 | 0.013 | 0.028 | 0.053 | 0.224 | 0.178 | 0.016 | 0.002 | 0.035 | 0.058 | 0.126 | 0.238 | 1 |

TABLE 3

| Corr | Beam 16 | Beam 17 | Beam 18 | Beam 19 | Beam 20 | Beam 21 | Beam 22 | Beam 23 | Beam 24 | Beam 25 | Beam 26 | Beam 27 | Beam 28 | Beam 29 | Beam 30 | Beam 31 |
|---|---|---|---|---|---|---|---|---|---|---|---|---|---|---|---|---|
| Beam 0 | 0.243 | 0.058 | 0.031 | 0.014 | 0.009 | 0.001 | 0.004 | 0.043 | 0.239 | 0.057 | 0.03 | 0.014 | 0.008 | 0.001 | 0.004 | 0.042 |
| Beam 1 | 0.058 | 0.243 | 0.006 | 0.008 | 0.011 | 0.015 | 0.017 | 0.004 | 0.057 | 0.239 | 0.006 | 0.008 | 0.011 | 0.017 | 0.017 | 0.004 |
| Beam 2 | 0.031 | 0.006 | 0.243 | 0.02 | 0.017 | 0.02 | 0.018 | 0.001 | 0.03 | 0.006 | 0.239 | 0.019 | 0.016 | 0.02 | 0.017 | 0.001 |
| Beam 3 | 0.014 | 0.008 | 0.02 | 0.243 | 0.011 | 0.017 | 0.011 | 0.009 | 0.014 | 0.008 | 0.019 | 0.239 | 0.011 | 0.016 | 0.011 | 0.008 |
| Beam 4 | 0.009 | 0.011 | 0.017 | 0.011 | 0.243 | 0.02 | 0.008 | 0.014 | 0.008 | 0.011 | 0.016 | 0.011 | 0.239 | 0.019 | 0.008 | 0.014 |
| Beam 5 | 0.001 | 0.018 | 0.02 | 0.017 | 0.02 | 0.243 | 0.006 | 0.031 | 0.001 | 0.017 | 0.02 | 0.016 | 0.019 | 0.239 | 0.006 | 0.03 |
| Beam 6 | 0.004 | 0.017 | 0.018 | 0.011 | 0.008 | 0.006 | 0.243 | 0.058 | 0.004 | 0.017 | 0.017 | 0.011 | 0.008 | 0.006 | 0.239 | 0.057 |
| Beam 7 | 0.043 | 0.004 | 0.001 | 0.009 | 0.014 | 0.031 | 0.058 | 0.243 | 0.042 | 0.004 | 0.001 | 0.008 | 0.014 | 0.03 | 0.057 | 0.239 |
| Beam 8 | 0.248 | 0.059 | 0.031 | 0.014 | 0.009 | 0.001 | 0.004 | 0.044 | 0.263 | 0.063 | 0.033 | 0.015 | 0.009 | 0.001 | 0.004 | 0.047 |
| Beam 9 | 0.059 | 0.248 | 0.006 | 0.008 | 0.011 | 0.018 | 0.018 | 0.004 | 0.063 | 0.263 | 0.007 | 0.009 | 0.012 | 0.019 | 0.019 | 0.004 |
| Beam 10 | 0.031 | 0.006 | 0.248 | 0.002 | 0.017 | 0.021 | 0.018 | 0.001 | 0.033 | 0.007 | 0.263 | 0.021 | 0.018 | 0.022 | 0.019 | 0.001 |
| Beam 11 | 0.014 | 0.008 | 0.02 | 0.248 | 0.011 | 0.017 | 0.011 | 0.009 | 0.015 | 0.009 | 0.021 | 0.263 | 0.012 | 0.018 | 0.012 | 0.009 |
| Beam 12 | 0.009 | 0.011 | 0.017 | 0.011 | 0.248 | 0.02 | 0.008 | 0.014 | 0.009 | 0.012 | 0.018 | 0.012 | 0.263 | 0.021 | 0.009 | 0.015 |
| Beam 13 | 0.001 | 0.018 | 0.021 | 0.017 | 0.02 | 0.248 | 0.006 | 0.031 | 0.001 | 0.019 | 0.022 | 0.018 | 0.021 | 0.263 | 0.007 | 0.033 |
| Beam 14 | 0.004 | 0.018 | 0.018 | 0.011 | 0.008 | 0.006 | 0.248 | 0.059 | 0.004 | 0.019 | 0.019 | 0.012 | 0.009 | 0.007 | 0.263 | 0.063 |
| Beam 15 | 0.044 | 0.004 | 0.001 | 0.009 | 0.014 | 0.031 | 0.059 | 0.248 | 0.047 | 0.004 | 0.001 | 0.009 | 0.015 | 0.033 | 0.063 | 0.263 |

TABLE 4

| Corr | Beam 0 | Beam 1 | Beam 2 | Beam 3 | Beam 4 | Beam 5 | Beam 6 | Beam 7 | Beam 8 | Beam 9 | Beam 10 | Beam 11 | Beam 12 | Beam 13 | Beam 14 | Beam 15 |
|---|---|---|---|---|---|---|---|---|---|---|---|---|---|---|---|---|
| Beam 16 | 0.243 | 0.058 | 0.031 | 0.014 | 0.009 | 0.001 | 0.004 | 0.043 | 0.248 | 0.059 | 0.031 | 0.014 | 0.009 | 0.001 | 0.004 | 0.044 |
| Beam 17 | 0.058 | 0.243 | 0.006 | 0.008 | 0.011 | 0.018 | 0.017 | 0.014 | 0.059 | 0.248 | 0.006 | 0.008 | 0.011 | 0.018 | 0.018 | 0.004 |
| Beam 18 | 0.031 | 0.006 | 0.243 | 0.02 | 0.017 | 0.02 | 0.018 | 0.001 | 0.031 | 0.006 | 0.248 | 0.02 | 0.017 | 0.021 | 0.018 | 0.001 |
| Beam 19 | 0.014 | 0.008 | 0.02 | 0.243 | 0.011 | 0.017 | 0.011 | 0.009 | 0.014 | 0.008 | 0.02 | 0.248 | 0.011 | 0.017 | 0.011 | 0.009 |
| Beam 20 | 0.009 | 0.011 | 0.017 | 0.011 | 0.243 | 0.02 | 0.008 | 0.014 | 0.009 | 0.011 | 0.017 | 0.011 | 0.248 | 0.02 | 0.008 | 0.014 |
| Beam 21 | 0.001 | 0.018 | 0.02 | 0.017 | 0.02 | 0.243 | 0.006 | 0.031 | 0.001 | 0.018 | 0.021 | 0.017 | 0.02 | 0.248 | 0.006 | 0.031 |
| Beam 22 | 0.004 | 0.017 | 0.018 | 0.011 | 0.008 | 0.006 | 0.243 | 0.058 | 0.004 | 0.018 | 0.018 | 0.011 | 0.008 | 0.006 | 0.248 | 0.059 |
| Beam 23 | 0.043 | 0.004 | 0.001 | 0.009 | 0.014 | 0.031 | 0.058 | 0.243 | 0.044 | 0.004 | 0.001 | 0.009 | 0.014 | 0.031 | 0.059 | 0.248 |
| Beam 24 | 0.239 | 0.057 | 0.03 | 0.014 | 0.008 | 0.001 | 0.004 | 0.042 | 0.263 | 0.063 | 0.033 | 0.015 | 0.009 | 0.001 | 0.004 | 0.047 |
| Beam 25 | 0.057 | 0.239 | 0.006 | 0.008 | 0.011 | 0.017 | 0.017 | 0.004 | 0.063 | 0.263 | 0.007 | 0.009 | 0.012 | 0.019 | 0.019 | 0.004 |
| Beam 26 | 0.03 | 0.006 | 0.239 | 0.019 | 0.016 | 0.02 | 0.017 | 0.001 | 0.033 | 0.007 | 0.263 | 0.021 | 0.018 | 0.022 | 0.019 | 0.001 |
| Beam 27 | 0.014 | 0.008 | 0.019 | 0.239 | 0.011 | 0.016 | 0.011 | 0.008 | 0.015 | 0.009 | 0.021 | 0.263 | 0.012 | 0.018 | 0.012 | 0.009 |
| Beam 28 | 0.008 | 0.011 | 0.016 | 0.011 | 0.239 | 0.019 | 0.008 | 0.014 | 0.009 | 0.012 | 0.018 | 0.012 | 0.263 | 0.021 | 0.009 | 0.015 |
| Beam 29 | 0.001 | 0.017 | 0.02 | 0.016 | 0.019 | 0.239 | 0.006 | 0.03 | 0.001 | 0.019 | 0.022 | 0.018 | 0.021 | 0.263 | 0.007 | 0.033 |
| Beam 30 | 0.004 | 0.017 | 0.017 | 0.011 | 0.008 | 0.006 | 0.239 | 0.057 | 0.004 | 0.019 | 0.019 | 0.012 | 0.009 | 0.007 | 0.263 | 0.063 |
| Beam 31 | 0.042 | 0.004 | 0.001 | 0.008 | 0.014 | 0.03 | 0.057 | 0.239 | 0.047 | 0.004 | 0.001 | 0.009 | 0.015 | 0.033 | 0.063 | 0.263 |

TABLE 5

| Corr | Beam 16 | Beam 17 | Beam 18 | Beam 19 | Beam 20 | Beam 21 | Beam 22 | Beam 23 | Beam 24 | Beam 25 | Beam 26 | Beam 27 | Beam 28 | Beam 29 | Beam 30 | Beam 31 |
|---|---|---|---|---|---|---|---|---|---|---|---|---|---|---|---|---|
| Beam 16 | 1 | 0.238 | 0.126 | 0.058 | 0.035 | 0.002 | 0.016 | 0.178 | 0.321 | 0.076 | 0.004 | 0.019 | 0.011 | 0.001 | 0.005 | 0.057 |
| Beam 17 | 0.238 | 1 | 0.025 | 0.033 | 0.045 | 0.072 | 0.071 | 0.016 | 0.076 | 0.321 | 0.008 | 0.011 | 0.014 | 0.023 | 0.023 | 0.005 |
| Beam 18 | 0.126 | 0.025 | 1 | 0.08 | 0.068 | 0.083 | 0.072 | 0.002 | 0.004 | 0.008 | 0.321 | 0.026 | 0.022 | 0.027 | 0.023 | 0.001 |
| Beam 19 | 0.058 | 0.033 | 0.08 | 1 | 0.046 | 0.068 | 0.045 | 0.035 | 0.019 | 0.011 | 0.026 | 0.321 | 0.015 | 0.022 | 0.014 | 0.011 |
| Beam 20 | 0.035 | 0.045 | 0.068 | 0.046 | 1 | 0.08 | 0.033 | 0.058 | 0.011 | 0.014 | 0.022 | 0.015 | 0.321 | 0.026 | 0.011 | 0.019 |
| Beam 21 | 0.002 | 0.072 | 0.083 | 0.068 | 0.08 | 1 | 0.025 | 0.126 | 0.001 | 0.023 | 0.027 | 0.022 | 0.026 | 0.321 | 0.008 | 0.04 |
| Beam 22 | 0.016 | 0.071 | 0.072 | 0.045 | 0.033 | 0.025 | 1 | 0.238 | 0.005 | 0.023 | 0.023 | 0.014 | 0.011 | 0.008 | 0.321 | 0.076 |
| Beam 23 | 0.178 | 0.016 | 0.002 | 0.035 | 0.058 | 0.126 | 0.238 | 1 | 0.057 | 0.005 | 0.001 | 0.011 | 0.019 | 0.04 | 0.076 | 0.321 |
| Beam 24 | 0.321 | 0.076 | 0.04 | 0.019 | 0.011 | 0.001 | 0.005 | 0.057 | 1 | 0.238 | 0.126 | 0.058 | 0.035 | 0.002 | 0.016 | 0.178 |
| Beam 25 | 0.076 | 0.321 | 0.008 | 0.011 | 0.014 | 0.023 | 0.023 | 0.005 | 0.238 | 1 | 0.025 | 0.033 | 0.045 | 0.072 | 0.071 | 0.0016 |
| Beam 26 | 0.04 | 0.008 | 0.321 | 0.026 | 0.022 | 0.027 | 0.023 | 0.001 | 0.126 | 0.025 | 1 | 0.08 | 0.068 | 0.083 | 0.072 | 0.002 |
| Beam 27 | 0.019 | 0.011 | 0.026 | 0.321 | 0.015 | 0.022 | 0.014 | 0.011 | 0.058 | 0.033 | 0.08 | 1 | 0.046 | 0.068 | 0.045 | 0.035 |
| Beam 28 | 0.011 | 0.014 | 0.022 | 0.015 | 0.321 | 0.026 | 0.011 | 0.019 | 0.035 | 0.045 | 0.068 | 0.046 | 1 | 0.08 | 0.033 | 0.058 |
| Beam 29 | 0.001 | 0.023 | 0.027 | 0.022 | 0.026 | 0.321 | 0.008 | 0.04 | 0.002 | 0.072 | 0.083 | 0.068 | 0.08 | 1 | 0.025 | 0.126 |
| Beam 30 | 0.005 | 0.023 | 0.023 | 0.014 | 0.011 | 0.008 | 0.321 | 0.076 | 0.016 | 0.071 | 0.072 | 0.045 | 0.033 | 0.025 | 1 | 0.238 |
| Beam 31 | 0.057 | 0.005 | 0.001 | 0.011 | 0.019 | 0.04 | 0.076 | 0.321 | 0.178 | 0.016 | 0.002 | 0.035 | 0.058 | 0.126 | 0.238 | 1 |

In an implementation, acquiring the energy value of the energy projection of the downlink scheduling service of each UE of the multiple UEs on each preset beam of the multiple preset beams includes the following: In the case where each UE has the downlink scheduling service, an energy projection of scheduling of each scheduling layer is performed on the multiple preset beams according to the actual number of scheduling layers of each UE corresponding to the downlink scheduling service; a superimposed energy value of an energy projection of the downlink scheduling service on each preset beam is calculated; and the superimposed energy value is used as the energy value of the energy projection of the downlink scheduling service of the each UE on the each preset beam.

When the base station has downlink data to send on the PDSCH, the base station performs an energy projection of the scheduling of each layer of the PDSCH service on all preset beams according to an actual number of scheduling layers of the UE corresponding to the PDSCH service, and then the energy values of energy projections of the scheduling of all layers on each preset beam are superimposed to obtain a superimposed energy value. The superimposed energy value is the energy value of the energy projection of the downlink scheduling service on the preset beam.

In an implementation, using the preset beam corresponding to the energy value meeting the preset beam home condition among all the energy values of the energy projection of the downlink scheduling service of the each UE on the multiple preset beams as the home beam of the each UE includes the following: determining the largest energy value among all the energy values of the energy projection of the downlink scheduling service of the each UE on the multiple preset beams as the energy value meeting the preset beam home condition, and using a preset beam corresponding to the largest energy value as the home beam of each UE.

After the energy value superimposed by the energy projection of each preset beam is obtained, the energy values of multiple preset beams may be compared. The largest energy value is considered as the energy value meeting the preset beam home condition, and the preset beam with the largest energy value is used as the home beam of the UE, and the identity document (ID) (index) of the home beam is identified. By analogy, the home beam IDs of all UEs are identified.

In an implementation, determining, according to the home beams and the preset beam space correlation data of the two UEs in the multiple UEs, the space association relationship between the two UEs includes querying, according to two home beams of the two UEs, a space correlation relationship value between the two home beams from the preset beam space correlation data. The space correlation relationship value between the two home beams represents the space association relationship between the two UEs.

After the home beam where each UE is located and is obtained and the ID of the home beam is identified, the space correlation relationship value between the two home beams may be queried from the preset beam space correlation data according to the IDs of every two home beams, and the space correlation relationship value may reflect the space association relationship between the corresponding two UEs. In this manner, the space association relationship between two UEs can be determined for any two UEs. The space correlation of different UEs under different beams is acquired. The smaller the correlation between two UEs is, the more orthogonal the UEs tend to be. MU-MIMO may be adopted to send data between UEs to improve network capacity. A threshold may be configured to determine whether the space division multiplexing technology may be used to send data between UEs. When the uplink SRS signal measurement is inaccurate, the SRS measurement reported by a terminal is lost, or the terminal capability level does not support SRS rotation, the use of beam quantization correlation can well compensate for system performance loss due to the inability to perform large-scale multi-user space division multiplexing caused by insufficient correlation measurement information.

Figure 4:
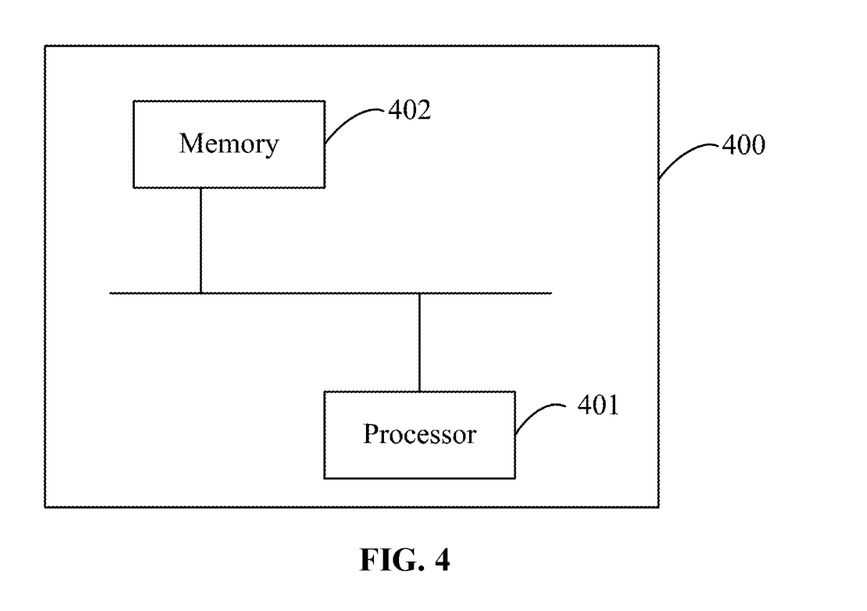
FIG. 4 is a diagram illustrating the structure of a base station according to embodiments of the present application.

Embodiments of the present application provide a base station. As shown in FIG. 4, the base station 400 includes a processor 401 and a memory 402, a program stored on the memory and executable on the processor, and a data bus for enabling connection communication between the processor 401 and the memory 402. The program, when executed by the processor 401, implements the method for determining a space association relationship between users of any embodiment of the present application.

Embodiments of the present application provide a storage medium for computer-readable storage. The storage medium stores at least one program executable by at least one processor to implement the method for determining a space association relationship between users of any embodiment of the present application.

It is to be understood by those of ordinary skill in the art that some or all steps of the preceding methods and function modules/units in the preceding system or device may be implemented as software, firmware, hardware, and suitable combinations thereof.

In the hardware implementation, the division of the function modules/units in the preceding description may not correspond to the division of physical components. For example, one physical component may have multiple functions, or one function or step may be performed cooperatively by multiple physical components. Some or all physical components may be implemented as software executed by a processor, such as a central processing unit, a digital signal processor, or a microprocessor, may be implemented as hardware, or may be implemented as integrated circuits, such as application-specific integrated circuits. Such software may be distributed on computer-readable media. The computer-readable media may include computer storage media (or non-transitory media) and communication media (or transitory media). As known to those of ordinary skill in the art, the term computer storage media includes volatile and non-volatile as well as removable and non-removable media implemented in any method or technology for storing information (such as computer-readable instructions, data structures, program modules, or other data). The computer storage media include, but are not limited to, a random-access memory (RAM), a read-only memory (ROM), an electrically erasable programmable read-only memory (EEPROM), a flash memory, or another memory technology, a compact disc read-only memory (CD-ROM), a digital video disc (DVD), or another optical disc storage, a magnetic cassette, a magnetic tape, disk storage, or another magnetic storage apparatus, or any other medium used for storing desired information and accessible by a computer. Moreover, as known to those of ordinary skill in the art, the communication media generally include computer-readable instructions, data structures, program modules, or other data in a modulated data signal such as a carrier wave or other transport mechanism and may include any information delivery medium.

What is claimed is:

1. A method for determining a space association relationship between users, comprising:

acquiring an energy value of an energy projection of a downlink scheduling service of each UE of a plurality of user equipments (UEs) on each preset beam of a plurality of preset beams;

using a preset beam corresponding to an energy value meeting a preset beam home condition among all energy values of an energy projection of the downlink scheduling service of the each UE on the plurality of preset beams as a home beam of the each UE; and determining, according to home beams of two UEs of the plurality of UEs and preset beam space correlation data, a space association relationship between the two UEs; wherein the preset beam space correlation data comprises a space correlation relationship value between every two preset beams of the plurality of preset beams.

2. The method of claim 1, wherein before acquiring the energy value of the energy projection of the downlink scheduling service of the each UE of the plurality of user equipments (UEs) on the each preset beam of the plurality of preset beams, the method further comprises:

configuring, according to a horizontal opening angle of an antenna and a vertical opening angle of the antenna, the plurality of preset beams arranged in rows in a horizontal direction and in columns in a vertical direction; and configuring a Non Zero Power-CSI-RS (NZP-CSI-RS) resource corresponding to the each preset beam, wherein the NZP-CSI-RS resource corresponding to the each preset beam is used for measuring reference signal received power of the each preset beam.

3. The method of claim 2, wherein configuring, according to the horizontal opening angle of the antenna and the vertical opening angle of the antenna, the plurality of preset beams arranged in rows in the horizontal direction and in columns in the vertical direction comprises:

generating the plurality of preset beams on an air interface by division of the horizontal opening angle of the antenna according to a first division number and division of the vertical opening angle of the antenna according to a second division number.

4. The method of claim 2, wherein configuring the NZP-CSI-RS resource corresponding to the each preset beam comprises:

configuring single-port NZP-CSI-RS resources whose number is the same as a number of the plurality of preset beams through higher-layer signaling; and configuring a corresponding relationship between each NZP-CSI-RS resource and one preset beam of the plurality of preset beams.

5. The method of claim 2, wherein after configuring the NZP-CSI-RS resource corresponding to the each preset beam, the method further comprises:

determining, according to beam power of the every two preset beams and space relationship between the every two preset beams, the space correlation relationship value between the every two preset beams, wherein the preset beam space correlation data are a set of the space correlation relationship value between the every two preset beams of the plurality of preset beams.

6. The method of claim 1, wherein acquiring the energy value of the energy projection of the downlink scheduling service of the each UE of the plurality of UEs on the each preset beam of the plurality of preset beams comprises:

in a case where the each UE has the downlink scheduling service, performing an energy projection of scheduling of each scheduling layer of the downlink scheduling service on the plurality of preset beams according to an actual number of scheduling layers of the each UE corresponding to the downlink scheduling service, calculating a superimposed energy value of energy projections of scheduling of all scheduling layers of the downlink scheduling service on the each preset beam, and using the superimposed energy value as the energy value of the energy projection of the downlink scheduling service of the each UE on the each preset beam.

7. The method of claim 6, wherein using the preset beam corresponding to the energy value meeting the preset beam home condition among all the energy values of the energy projection of the downlink scheduling service of the each UE on the plurality of preset beams as the home beam of the each UE comprises:

determining a largest energy value among all the energy values of the energy projection of the downlink scheduling service of the each UE on the plurality of preset beams as the energy value meeting the preset beam home condition, and using a preset beam corresponding to the largest energy value as the home beam of the each UE.

8. The method of claim 1, wherein determining, according to the home beams and the preset beam space correlation data of the two UEs in the plurality of UEs, the space association relationship between the two UEs comprises:

querying, according to two home beams of the two UEs, a space correlation relationship value between the two home beams from the preset beam space correlation data, wherein the space correlation relationship value between the two home beams represents the space association relationship between the two UEs.

9. A base station, comprising a memory, a processor, a program stored on the memory and executable on the processor, and a data bus for enabling connection communication between the processor and the memory, wherein the program, when executed by the processor, implements the following:

acquiring an energy value of an energy projection of a downlink scheduling service of each UE of a plurality of user equipments (UEs) on each preset beam of a plurality of preset beams;

using a preset beam corresponding to an energy value meeting a preset beam home condition among all energy values of an energy projection of the downlink scheduling service of the each UE on the plurality of preset beams as a home beam of the each UE; and determining, according to home beams of two UEs of the plurality of UEs and preset beam space correlation data, a space association relationship between the two UEs; wherein the preset beam space correlation data comprises a space correlation relationship value between every two preset beams of the plurality of preset beams.

10. A non-transitory storage medium for computer-readable storage, wherein the storage medium stores at least one program executable by at least one processor to implement the following:

acquiring an energy value of an energy projection of a downlink scheduling service of each UE of a plurality of user equipments (UEs) on each preset beam of a plurality of preset beams;

using a preset beam corresponding to an energy value meeting a preset beam home condition among all energy values of an energy projection of the downlink scheduling service of the each UE on the plurality of preset beams as a home beam of the each UE; and determining, according to home beams of two UEs of the plurality of UEs and preset beam space correlation data, a space association relationship between the two UEs; wherein the preset beam space correlation data comprises a space correlation relationship value between every two preset beams of the plurality of preset beams.

11. A base station, comprising a memory, a processor, a program stored on the memory and executable on the processor, and a data bus for enabling connection communication between the processor and the memory, wherein the program, when executed by the processor, implements the method for determining a space association relationship between users of claim 2.

12. A base station, comprising a memory, a processor, a program stored on the memory and executable on the processor, and a data bus for enabling connection communication between the processor and the memory, wherein the program, when executed by the processor, implements the method for determining a space association relationship between users of claim 3.

13. A base station, comprising a memory, a processor, a program stored on the memory and executable on the processor, and a data bus for enabling connection communication between the processor and the memory, wherein the program, when executed by the processor, implements the method for determining a space association relationship between users of claim 4.

14. A base station, comprising a memory, a processor, a program stored on the memory and executable on the processor, and a data bus for enabling connection communication between the processor and the memory, wherein the program, when executed by the processor, implements the method for determining a space association relationship between users of claim 5.

15. A base station, comprising a memory, a processor, a program stored on the memory and executable on the processor, and a data bus for enabling connection communication between the processor and the memory, wherein the program, when executed by the processor, implements the method for determining a space association relationship between users of claim 6.

16. A base station, comprising a memory, a processor, a program stored on the memory and executable on the processor, and a data bus for enabling connection communication between the processor and the memory, wherein the program, when executed by the processor, implements the method for determining a space association relationship between users of claim 7.

17. A base station, comprising a memory, a processor, a program stored on the memory and executable on the processor, and a data bus for enabling connection communication between the processor and the memory, wherein the program, when executed by the processor, implements the method for determining a space association relationship between users of claim 8.

18. A non-transitory storage medium for computer-readable storage, wherein the storage medium stores at least one program executable by at least one processor to implement the method for determining a space association relationship between users of claim 2.

19. A non-transitory storage medium for computer-readable storage, wherein the storage medium stores at least one program executable by at least one processor to implement the method for determining a space association relationship between users of claim 3.

20. A non-transitory storage medium for computer-readable storage, wherein the storage medium stores at least one program executable by at least one processor to implement the method for determining a space association relationship between users of claim 4.

* * * * *